United States Patent [19]
Fujii

[11] Patent Number: 4,504,125
[45] Date of Patent: Mar. 12, 1985

[54] ZOOM LENS SYSTEM

[75] Inventor: Tooru Fujii, Hino, Japan

[73] Assignee: Olympus Optical Co., Ltd., Tokyo, Japan

[21] Appl. No.: 439,294

[22] Filed: Nov. 4, 1982

[30] Foreign Application Priority Data

Nov. 13, 1981 [JP] Japan ................. 56-181196

[51] Int. Cl.³ .............................................. G02B 15/18
[52] U.S. Cl. ........................................ 350/427; 350/423
[58] Field of Search ............................... 350/423, 427

[56] References Cited
U.S. PATENT DOCUMENTS

| 4,223,981 | 9/1980 | Mizutani et al. | 350/423 |
| 4,380,377 | 4/1983 | Sato et al. | 350/427 |
| 4,439,017 | 3/1984 | Yamaguchi | 350/423 X |
| 4,456,341 | 6/1984 | Kato | 350/427 |

FOREIGN PATENT DOCUMENTS

| 53-131852 | 11/1978 | Japan . | |
| 56-42208 | 4/1981 | Japan . | |
| 56-155913 | 12/1981 | Japan | 350/423 |

Primary Examiner—John K. Corbin
Assistant Examiner—Scott J. Sugarman
Attorney, Agent, or Firm—Cushman, Darby & Cushman

[57] ABSTRACT

A zoom lens system with a zoom ratio about 3 comprising a first lens group to be used for focusing, a second lens group which is a variator, a third lens group which is a compensator, and a fourth lens group which is a master lens, the second lens group being provided with a lens surface having the correcting function for chromatic aberration and a lens surface having the correcting function for spherical aberration so that chromatic aberration of spherical aberration is thereby corrected favorably.

5 Claims, 4 Drawing Figures

ZOOM LENS SYSTEM

BACKGROUND OF THE INVENTION (a) Field of the Invention

The present invention relates to a zoom lens system for still cameras with a zoom ratio about 3.

(b) Description of the Prior Art

As zoom lens systems for still cameras, there are known ones disclosed, for example, in Japanese published unexamined patent application No. 131852/78 and Japanese published unexamined patent application No. 42208/81. Out of the above-mentioned known zoom lens systems, the former (Japanese published unexamined patent application No. 131852/78) has a master lens with simple lens configuration. However, its zoom ratio is small, i.e., 2.5, and its aperture ratio is small, i.e., the F number is 4.5. The latter (Japanese published unexamined patent application No. 42208/81) has a zoom ratio about 3. However, its chromatic aberration of spherical aberration in the teleposition is large and, therefore, the contrast of image obtained in the teleposition becomes unfavourable.

In case of zoom lens systems with a zoom ratio about 3 like the latter zoom lens system, chromatic aberration of spherical aberration in the teleposition becomes large. As a result, the contrast decreases and it is comparatively difficult to improve this point.

SUMMARY OF THE INVENTION

It is, therefore, a primary object of the present invention to provide a zoom lens system for still cameras with a zoom ratio about 3 in which a lens surface having the correcting function for chromatic aberration and a lens surface having the correcting function for spherical aberration are respectively provided in the variator constituting the zoom lens system and chromatic aberration of spherical aberration is thereby corrected favourably.

The zoom lens system according to the present invention comprises a first lens group I having positive refractive power, a second lens group II having negative refractive power, a third lens group III having positive refractive power and a fourth lens group IV having positive refractive power as shown in FIG. 1. Out of these lens groups, the first lens group I is a focusing lens group to be used for focusing of the lens system, the second lens group II is a variator to be used for variation of magnification of the lens system by moving the second lens group II along the optical axis, the third lens group III is a compensator to be used for compensation for the movement of image surface to be caused when the second lens group II is moved, and the fourth lens group IV is a master lens. The first lens group I comprises a cemented doublet, which is formed by cementing a negative lens and a positive lens, and a positive lens; the second lens group II comprises a cemented doublet, which is formed by cementing a biconcave lens and a positive meniscus lens arranged to be convex toward the object side, a biconcave lens and a biconvex lens; the third lens group III comprises a cemented doublet formed by cementing a biconvex lens and a negative meniscus lens; and the fourth lens group IV comprises a positive lens, a biconcave lens, a negative meniscus lens having a concave surface with a small radius of curvature and arranged to be concave toward the object side, and a biconvex lens. In other words, the zoom lens system according to the present invention is a mechanical compensation type zoom lens system with ten-component thirteen-element lens configuration. Besides, the zoom lens system according to the present invention is arranged to fulfill the conditions (1) through (5) shown below.

(1) $0.15 < |f_{II}|/f_t < 0.19$ (2) $0.95 < f_I/f_{III} < 1$ (3) $2 < f_a/|f_{II}| < 3$ (4) $0.73 < r_7/|f_{II}| < 0.76$ (5) $23 < \nu_4 - \nu_5 < 29$

In the conditions shown in the above, reference symbol $f_t$ represents the focal length of the lens system as a whole in the teleposition, reference symbols $f_I$, $f_{II}$ and $f_{III}$ respectively represent the total focal lengths of the first lens group I, the second lens group II and the third lens group III, reference symbol $f_a$ represents the focal length of the lens component arranged on the image side in the second lens group II, reference symbol $r_7$ represents the radius of curvature of the cemented surface of the cemented doublet arranged on the object side in the second lens group II, and reference symbols $\nu_4$ and $\nu_5$ respectively represent Abbe's numbers of respective lens elements constituting the above-mentioned cemented doublet.

As described before, zoom lens systems with high zoom ratio have such tendency that the image becomes unfavourable especially in the teleposition because of chromatic aberration of spherical aberration. To eliminate this disadvantage, it is effective when the power of the first lens group I is made weak and the substantial F number of the first lens group I is thereby made large. However, this method is not preferable because the overall length of the lens system generally becomes large and, moreover, the intensity of light in the marginal portion generally becomes low (especially when photographing an object at a short distance).

In the present invention, it is so arranged that the second lens group II has a function to offset chromatic aberration to be caused in the teleposition and, at the same time, a convex lens is arranged in the rear position in the second lens group II in order to reduce variation of spherical aberration in the teleposition. By these arrangement, the zoom lens system is arranged so that the quality of image in the teleposition is kept favourable by keeping the power of the first lens group I strong. Besides, by making the power of the first lens group I strong as described in the above, it is possible to make the advancing amount of the front lens at the time of focusing small. Therefore, it is possible to obtain a zoom lens system which causes extremely small variation of aberrations, when the lens system is focused on an object at a long distance and focused on an object at a short distance, and the diamenter of the front lens thereof is small.

Now, explanation is given below for the afore-mentioned respective conditions which are established in order to materialize a zoom lens system which serves the object of the present invention.

The condition (1) is established in order to keep the zooming subsystem (which consists of the first lens group I, second lens group II and third lens group III) compactly and to thereby arrange the lens system as a whole compactly. If $|f_{II}|/f_t$ becomes smaller than the lower limit of the condition (1), variation of aberrations to be caused by the second lens group becomes large and, especially, it is unavoidable that curvature of field in the wide position becomes considerably large toward the positive direction in the marginal portion. If, on the contrary, $|f_{II}|/f_t$ becomes larger than the upper limit of the condition (1), the zooming subsystem becomes large and, consequently, the front lens diameter and overall length of the lens system increase necessarily.

The conditions (2) and (3) are fundamental conditions of the present invention. When $f_I/f_{III}$ becomes smaller than the lower limit of the condition (2), the power of the first lens group I becomes large and this is advantageous for making the front lens diameter small. However, the imaging magnification of the second lens group II increases and, consequently, chromatic aberration necessarily increases in the teleposition and cannot be corrected by the second lens group II. Moreover, positive distortion increases in the teleposition. If, on the contrary, $f_I/f_{III}$ becomes larger than the upper limit of the condition (2), the power of the first lens group I decreases and, consequently, the front lens diameter increases. At the same time, undercorrected chromatic aberration of higher order spherical aberration is caused at the third lens group III.

The condition (3) is established in order to reduce the variation of spherical aberration in the teleposition. If $f_a/|f_{II}|$ becomes smaller than the lower limit of the condition (3), spherical aberration in the teleposition will be undercorrected. If $f_a/|f_{II}|$ becomes larger than the upper limit of the condition (3), spherical aberration in the teleposition will be overcorrected and, at the same time, coma increases in respective positions (wide position, standard position and teleposition).

The condition (4) is established in order to balance paraxial chromatic aberration and chromatic aberration of spherical aberration. If $r_7/|f_{II}|$ becomes smaller than the lower limit of the condition (4), chromatic aberration of spherical aberration becomes too large in the wide position and teleposition and it is impossible to correct it by only varying Abbe's numbers of respective lens elements in the second lens group II. When, on the contrary, $r_7/|f_{II}|$ becomes larger than the upper limit of the condition (4), variation of chromatic aberration of spherical aberration becomes small. However, paraxial chromatic aberration is generally undercorrected and it is impossible to adjust it by only varying Abbe's numbers of respective lens elements in the second lens group II.

The condition (5) is established in order to further ensure the correcting effect by the condition (4). If $(\nu_4 - \nu_5)$ becomes larger than the upper limit of the condition (5), variation of chromatic aberration of spherical aberration in the wide position and teleposition becomes too large and it is impossible to correct it by only varying Abbe's numbers of respective lens elements in the second lens group II. When, on the contrary, $(\nu_4 - \nu_5)$ becomes smaller than the lower limit of the condition (5), variation of chromatic aberration of spherical aberration in the wide position and teleposition becomes small. However, paraxial chromatic aberration is generally undercorrected and it is impossible to correct it by only varying Abbe's numbers of respective lens elements in the second lens group II.

The zoom lens system which fulfills the conditions (1) through (5) explained in the above is an excellent zoom lens system which serves the object of the present invention. When, however, it is so arranged that the following conditions (6) through (9) are further fulfilled, it is possible to obtain a more excellent zoom lens system.

(6) $n_4, n_6 > 1.7$ (7) $n_{11}, n_{12} > 1.75$ (8) $n_{10}, n_{13} < 1.65$ (9) $\nu_{13} > 48$, $\nu_5, \nu_7 < 26$

In conditions shown in the above, reference symbols $n_4$ and $n_6$ respectively represent refractive indices of negative lenses out of respective lenses constituting the second lens group II, i.e., the negative lens element arranged on the object side in the cemented doublet and the biconcave single lens, reference symbols $n_{10}$, $n_{11}$, $n_{12}$ and $n_{13}$ respectively represent refractive indices of respective lens components constituting the fourth lens group IV, reference symbols $\nu_5$ and $\nu_7$ respectively represent Abbe's numbers of positive lenses out of respective lenses constituting the second lens group II, i.e., the positive lens element arranged on the image side in the cemented doublet and the biconvex single lens, and reference symbol $\nu_{13}$ represents Abbe's number of the biconvex lens component arranged on the image side in the fourth lens group IV.

Out of the conditions (6) through (9) shown in the above, the conditions (6), (7) and (8) are respectively established in order to prevent Petzval's sum from becoming a negative value as zoom lens systems with short overall length have such tendency that Petzval's sum becomes a negative value. If any of these conditions is not fulfilled, Petzval's sum becomes a negative value.

The condition (9) is established in order to prevent variation of lateral chromatic aberration to be caused at the time of zooming. If this condition is not fulfilled, variation of lateral chromatic aberration occurs at the time of zooming.

DETAILED DESCRIPTION OF THE PREFERRED EMBODIMENTS

Figure 1:
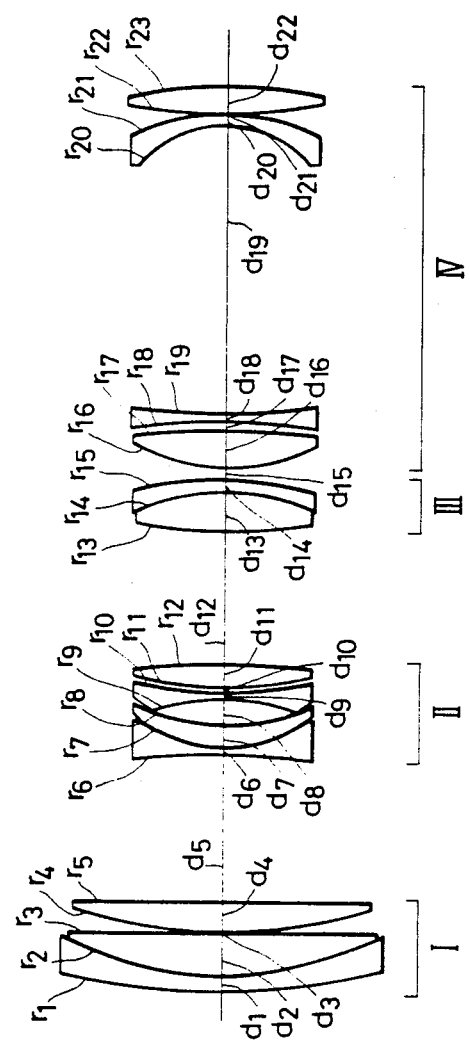
FIG. 1 shows a sectional view of the zoom lens system according to the present invention.

Now, preferred embodiments of the zoom lens system according to the present invention described so far are shown below.

| Embodiment 1 | | |
|---|---|---|
| $f = 67 \sim 194$, F 4 | | |
| $r_1 = 104.584$ | | |
| $d_1 = 2.7$ | $n_1 = 1.78472$ | $\nu_1 = 25.68$ |
| $r_2 = 56.047$ | | |
| $d_2 = 7.2$ | $n_2 = 1.58913$ | $\nu_2 = 60.97$ |
| $r_3 = -3513.726$ | | |
| $d_3 = 0.15$ | | |
| $r_4 = 84.41$ | | |
| $d_4 = 5$ | $n_3 = 1.51633$ | $\nu_3 = 64.15$ |
| $r_5 = -2910.332$ | | |
| $d_5 = l_1$ | | |
| $r_6 = -186.863$ | | |
| $d_6 = 1.5$ | $n_4 = 1.713$ | $\nu_4 = 53.84$ |
| $r_7 = 23.862$ | | |

-continued

| | | |
|---|---|---|
| $d_7 = 3.7$ | $n_5 = 1.80518$ | $\nu_5 = 25.43$ |
| $r_8 = 34.675$ | | |
| $d_8 = 4$ | | |
| $r_9 = -59.071$ | | |
| $d_9 = 1.45$ | $n_6 = 1.7725$ | $\nu_6 = 49.66$ |
| $r_{10} = 123.217$ | | |
| $d_{10} = 0.64$ | | |
| $r_{11} = 71.931$ | | |
| $d_{11} = 2.95$ | $n_7 = 1.80518$ | $\nu_7 = 25.43$ |
| $r_{12} = -7730.28$ | | |
| $d_{12} = l_2$ | | |
| $r_{13} = 116.711$ | | |
| $d_{13} = 5.84$ | $n_8 = 1.51633$ | $\nu_8 = 64.15$ |
| $r_{14} = -31.816$ | | |
| $d_{14} = 2.2$ | $n_9 = 1.78472$ | $\nu_9 = 25.68$ |
| $r_{15} = -54.816$ | | |
| $d_{15} = l_3$ | | |
| $r_{16} = 34.489$ | | |
| $d_{16} = 4.62$ | $n_{10} = 1.62012$ | $\nu_{10} = 49.66$ |
| $r_{17} = -2770.959$ | | |
| $d_{17} = 1.88$ | | |
| $r_{18} = -229.365$ | | |
| $d_{18} = 1.92$ | $n_{11} = 1.76182$ | $\nu_{11} = 26.52$ |
| $r_{19} = 191.998$ | | |
| $d_{19} = 45.653$ | | |
| $r_{20} = -18.906$ | | |
| $d_{20} = 1.92$ | $n_{12} = 1.7725$ | $\nu_{12} = 49.66$ |
| $r_{21} = -41.177$ | | |
| $d_{21} = 0.15$ | | |
| $r_{22} = 155.437$ | | |
| $d_{22} = 4.6$ | $n_{13} = 1.53172$ | $\nu_{13} = 48.9$ |
| $r_{23} = -48.663$ | | |

| f | $l_1$ | $l_2$ | $l_3$ |
|---|---|---|---|
| 67 | 1.282 | 36.535 | 11.431 |
| 114 | 23.524 | 23.47 | 2.256 |
| 194 | 36.589 | 1.228 | 11.431 |

$f_B = 41.143$
$f_I = 96.453$
$f_{II} = -31.67$
$f_{III} = 97.353$
$f_{IV} = 115.031$
$f_a = 88.526$

Embodiment 2
$f = 67\sim194 \quad F\,4$

| | | |
|---|---|---|
| $r_1 = 129.447$ | | |
| $d_1 = 2.6$ | $n_1 = 1.78472$ | $\nu_1 = 25.68$ |
| $r_2 = 58.346$ | | |
| $d_2 = 6.8$ | $n_2 = 1.6228$ | $\nu_2 = 57.06$ |
| $r_3 = \infty$ | | |
| $d_3 = 0.15$ | | |
| $r_4 = 84.325$ | | |
| $d_4 = 4.6$ | $n_3 = 1.61272$ | $\nu_3 = 58.75$ |
| $r_5 = \infty$ | | |
| $d_5 = l_1$ | | |
| $r_6 = -208.086$ | | |
| $d_6 = 1.5$ | $n_4 = 1.7432$ | $\nu_4 = 49.31$ |
| $r_7 = 23.861$ | | |
| $d_7 = 3.7$ | $n_5 = 1.78472$ | $\nu_5 = 25.68$ |
| $r_8 = 35.678$ | | |
| $d_8 = 4$ | | |
| $r_9 = -54.032$ | | |
| $d_9 = 1.45$ | $n_6 = 1.7725$ | $\nu_6 = 49.66$ |
| $r_{10} = 98.148$ | | |
| $d_{10} = 0.64$ | | |
| $r_{11} = 68.72$ | | |
| $d_{11} = 2.95$ | $n_7 = 1.78472$ | $\nu_7 = 25.68$ |
| $r_{12} = -254.398$ | | |
| $d_{12} = l_2$ | | |
| $r_{13} = 125.076$ | | |
| $d_{13} = 5.84$ | $n_8 = 1.51112$ | $\nu_8 = 60.48$ |
| $r_{14} = -30.267$ | | |
| $d_{14} = 2.2$ | $n_9 = 1.78472$ | $\nu\,25.68$ |
| $r_{15} = -51.696$ | | |
| $d_{15} = l_3$ | | |
| $r_{16} = 33.434$ | | |
| $d_{16} = 5.28$ | $n_{10} = 1.54072$ | $\nu_{10} = 47.2$ |
| $r_{17} = -227.929$ | | |
| $d_{17} = 1.7$ | | |
| $r_{18} = -137.992$ | | |
| $d_{18} = 2.16$ | $n_{11} = 1.84666$ | $\nu_{11} = 23.88$ |

-continued

| | | |
|---|---|---|
| $r_{19} = 612.979$ | | |
| $d_{19} = 46.24$ | | |
| $r_{20} = -19.236$ | | |
| $d_{20} = 1.95$ | $n_{12} = 1.7725$ | $\nu_{12} = 49.66$ |
| $r_{21} = -39.456$ | | |
| $d_{21} = 0.15$ | | |
| $r_{22} = 117.934$ | | |
| $d_{22} = 4.2$ | $n_{13} = 1.53172$ | $\nu_{13} = 48.9$ |
| $r_{23} = -67.342$ | | |

| f | $l_1$ | $l_2$ | $l_3$ |
|---|---|---|---|
| 67 | 1.962 | 36.24 | 11.039 |
| 114 | 24.203 | 23.175 | 1.863 |
| 194 | 37.268 | 0.933 | 11.039 |

$f_B = 40.84$
$f_I = 95.593$
$f_{II} = -31.67$
$f_{III} = 97.853$
$f_{IV} = 116.658$
$f_a = 69.226$

Embodiment 3
$f = 67\sim194 \quad F\,4$

| | | |
|---|---|---|
| $r_1 = 126.289$ | | |
| $d_1 = 2.2$ | $n_1 = 1.78472$ | $\nu_1 = 25.68$ |
| $r_2 = 57.106$ | | |
| $d_2 = 6.3$ | $n_2 = 1.6228$ | $\nu_2 = 57.06$ |
| $r_3 = 1616.56$ | | |
| $d_3 = 0.15$ | | |
| $r_4 = 85.153$ | | |
| $d_4 = 4.4$ | $n_3 = 1.6228$ | $\nu_3 = 57.06$ |
| $r_5 = -2726.243$ | | |
| $d_5 = l_1$ | | |
| $r_6 = -201.941$ | | |
| $d_6 = 1.48$ | $n_4 = 1.734$ | $\nu hd\,4 = 51.49$ |
| $r_7 = 23.917$ | | |
| $d_7 = 3.2$ | $n_5 = 1.78472$ | $\nu_5 = 25.68$ |
| $r_8 = 36.601$ | | |
| $d_8 = 4.5$ | | |
| $r_9 = -57.526$ | | |
| $d_9 = 1.48$ | $n_6 = 1.72$ | $\nu_6 = 50.25$ |
| $r_{10} = 93.55$ | | |
| $d_{10} = 0.65$ | | |
| $r_{11} = 67.273$ | | |
| $d_{11} = 3$ | $n_7 = 1.78472$ | $\nu_7 = 25.68$ |
| $r_{12} = -886.652$ | | |
| $d_{12} = l_2$ | | |
| $r_{13} = 128.789$ | | |
| $d_{13} = 5.95$ | $n_8 = 1.51823$ | $\nu_8 = 58.96$ |
| $r_{14} = -31.218$ | | |
| $d_{14} = 1.59$ | $n_9 = 1.78472$ | $\nu_9 = 25.68$ |
| $r_{15} = -53.43$ | | |
| $d_{15} = l_3$ | | |
| $r_{16} = 35.564$ | | |
| $d_{16} = 4.4$ | $n_{10} = 1.62012$ | $\nu_{10} = 49.66$ |
| $r_{17} = -1685.808$ | | |
| $d_{17} = 1.9$ | | |
| $r_{18} = -315.291$ | | |
| $d_{18} = 1.96$ | $n_{11} = 1.78472$ | $\nu_{11} = 25.68$ |
| $r_{19} = 156.572$ | | |
| $d_{19} = 46.57$ | | |
| $r_{20} = -20.109$ | | |
| $d_{20} = 1.96$ | $n_{12} = 1.7725$ | $\nu_{12} = 49.66$ |
| $r_{21} = -35.524$ | | |
| $d_{21} = 0.29$ | | |
| $r_{22} = 125.208$ | | |
| $d_{22} = 4$ | $n_{13} = 1.53172$ | $\nu_{13} = 48.9$ |
| $r_{23} = -86.763$ | | |

| f | $l_1$ | $l_2$ | $l_3$ |
|---|---|---|---|
| 67 | 1.225 | 36.487 | 12.025 |
| 114 | 23.88 | 23.179 | 2.679 |
| 194 | 37.188 | 0.524 | 12.025 |

$f_B = 44.12$
$f_I = 96.172$
$f_{II} = -32.259$
$f_{III} = 98.672$
$f_{IV} = 116.929$
$f_a = 79.794$

In embodiments shown in the above, reference symbols $r_1$ through $r_{23}$ respectively represent radii of curvature of respective lens surfaces, reference symbols $d_1$ through $d_{22}$ respectively represent thicknesses of respective lenses and airspaces between respective lenses, reference symbols $n_1$ through $n_{13}$ respectively represent refractive indices of respective lenses, reference symbols $\nu_1$ through $\nu_{13}$ respectively represent Abbe's numbers of respective lenses, reference symbol f represents the focal length of the lens system as a whole, reference symbols $f_I$, $f_{II}$, $f_{III}$ and $f_{IV}$ respectively represent total focal lengths of the first lens group I, the second lens group II, the third lens group III and the fourth lens group IV, reference symbol $f_a$ represents the focal length of the lens component arranged on the image side in the second lens group II, and reference symbol $f_B$ represents the back focal length.

The zoom lens systems according to respective embodiments shown in the above are arranged to be zoomed by moving the second lens group II(variator) and the third lens group III(compensator) along the optical axis. In other words, these lens systems are arranged to be zoomed by varying the airspaces $d_5 = l_1$, $d_{12} = l_2$ and $d_{15} = l_3$. In the data of respective embodiments, numerical values of $l_1$, $l_2$ and $l_3$ are shown for the cases that f=67, f=114 and f=194.

Figure 2:
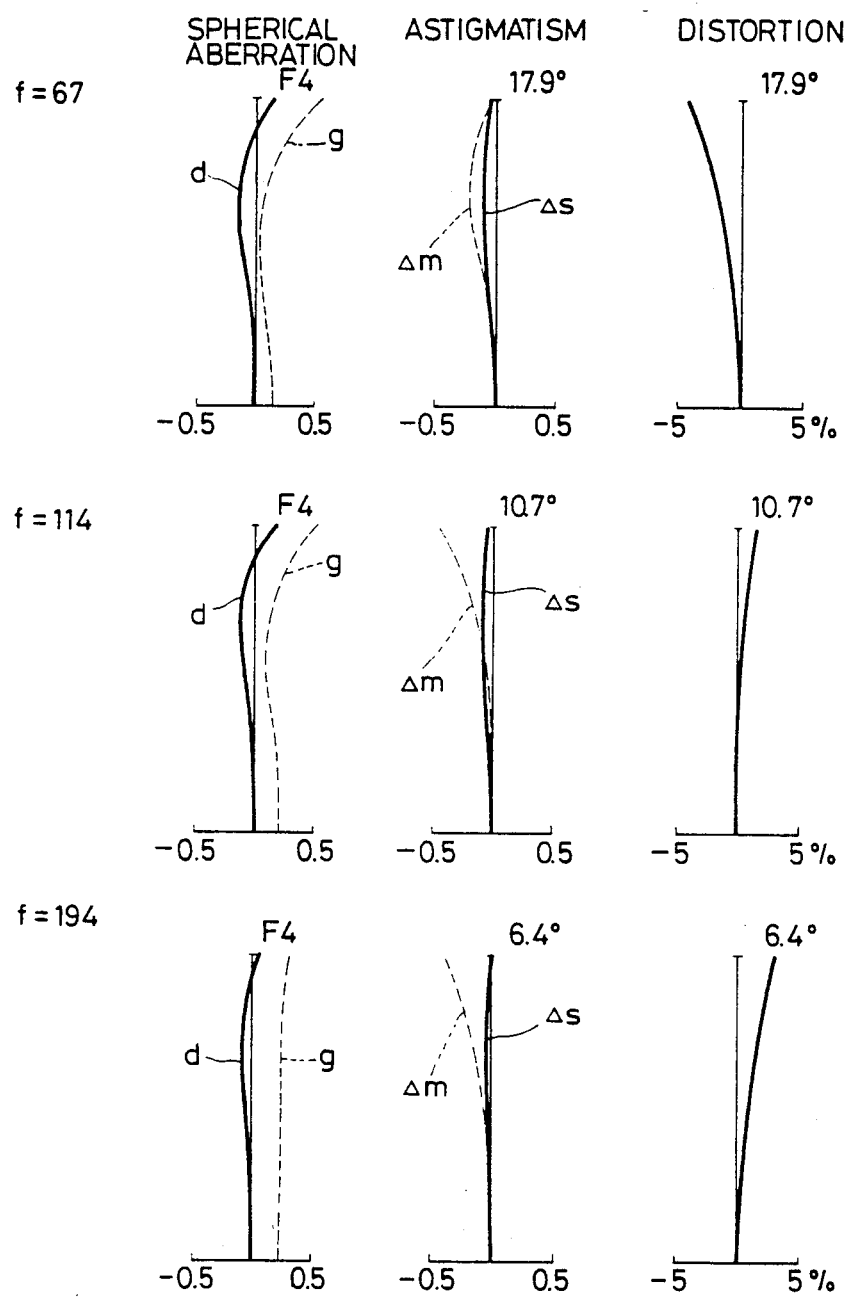
FIGS. 2 through 4 respectively show graphs illustrating aberration curves of Embodiments 1 through 3 of the present invention.
Figure 3:
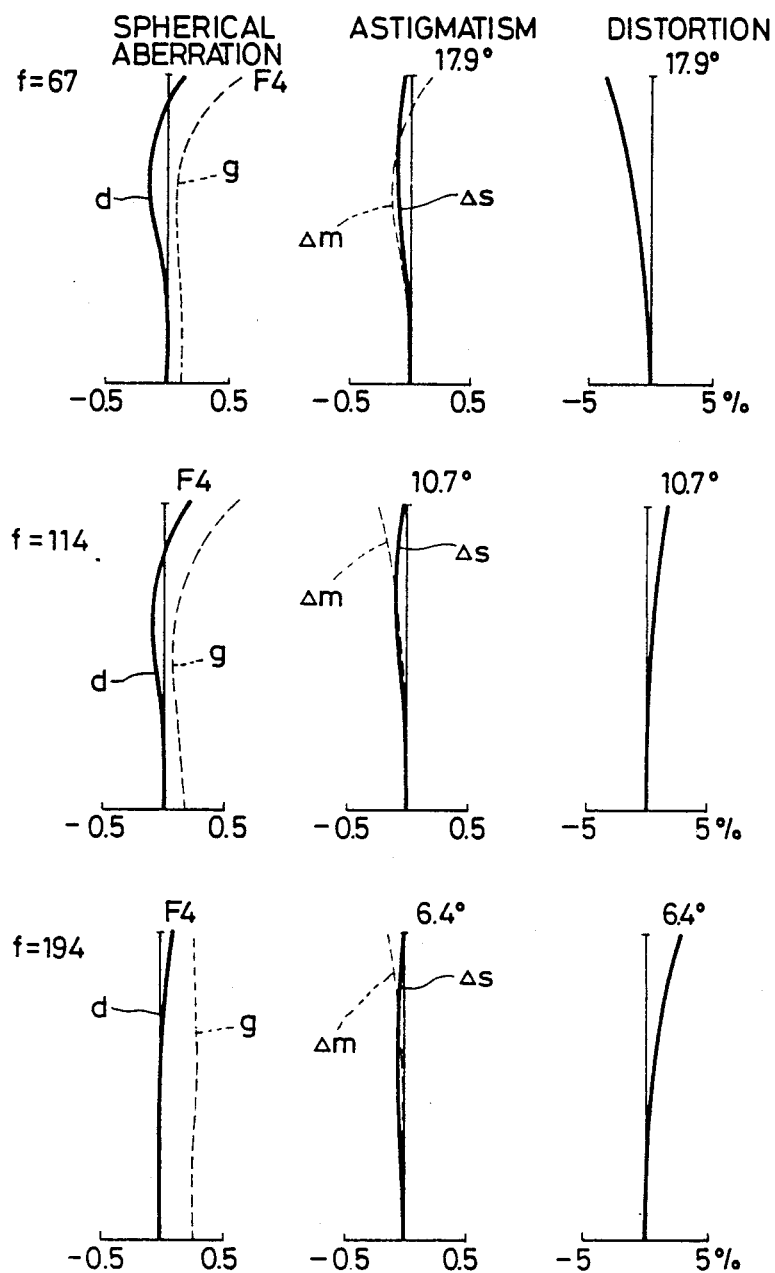
Figure 4:
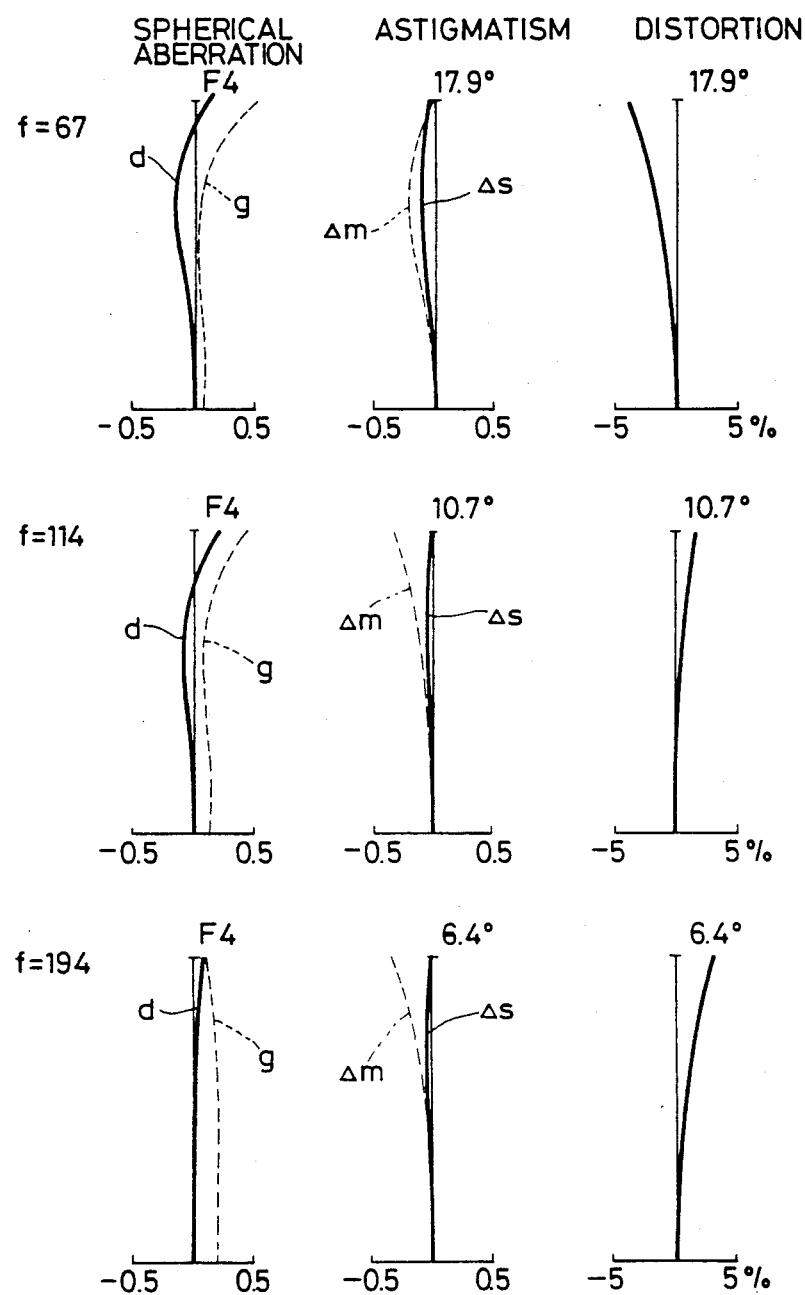

As described before, the zoom lens system according to the present invention is arranged to keep the variation of spherical aberration in the teleposition small by fulfilling the condition (3) and, at the same time, to keep chromatic aberration of spherical aberration small by fulfilling the conditions (4) and (5). This is evident from the graphs of aberration curves (FIGS. 2 through 4) of respective embodiments shown in the above.

Besides, in respective embodiments shown in the above, it is so arranged that the aperture stop S is moved together with the third lens group III. This arrangement is effective for reducing the front lens diameter required in the wide position and teleposition.

I claim:

1. A zoom lens system comprising a first lens group having positive refractive power, a second lens group having negative refractive power, a third lens group having positive refractive power and a fourth lens group having positive refractive power, said first lens group being used for focusing, said second lens group being used for variation of magnification, said third lens group being used for compensation for the movement of image surface to be caused when the magnification is varied by the second lens group; said first lens group comprises a cemented doublet, which is formed by cementing a negative lens and a positive lens, and a positive lens; said second lens group comprises a cemented doublet, which is formed by cementing a biconcave lens and a positive meniscus lens arranged to be convex toward the object side, and a biconcave lens and a biconvex lens; said third lens group comprises a cemented doublet formed by cementing a biconvex lens and a negative meniscus lens; and said fourth lens group comprises a positive lens, a biconcave lens, a negative meniscus lens having a concave surface with a small radius of curvature and arranged to be concave toward the object side, and a biconvex lens; said zoom lens system being arranged to fulfill the following conditions (1) through (5):

(1) $0.15 < |f_{II}|/f_t < 0.19$ (2) $0.95 < f_I/f_{III} < 1$ (3) $2 < f_a/|f_{II}| < 3$ (4) $0.73 < r_7/|f_{II}| < 0.76$ (5) $23 < \nu_4 - \nu_5 < 29$ wherein reference symbol $f_t$ represents the focal length of the lens system as a whole in the teleposition, reference symbols $f_I$, $f_{II}$ and $f_{III}$ respectively represent the total focal lengths of the first lens group, the second lens group and the third lens group, reference symbol $f_a$ represents the focal length of the lens component arranged on the image side in the second lens group, reference symbol $r_7$ represents the radius of curvature of the cemented surface of the cemented doublet arranged on the object side in the second lens group, and reference symbols $\nu_4$ and $\nu_5$ respectively represent Abbe's numbers of respective lens elements constituting the cemented doublet in the second lens group.

2. A zoom lens system according to claim 1 further fulfilling the following conditions (6) through (9):

(6) $n_4, n_6 > 1.7$ (7) $n_{11}, n_{12} > 1.75$ (8) $n_{10}, n_{13} < 1.65$ (9) $\nu_{13} > 48$, $\nu_5, \nu_7 < 26$ wherein reference symbol $n_4$ represents the refractive index of the lens element arranged on the object side in the cemented doublet constituting the second lens group, reference symbol $n_6$ represents the refractive index of the biconcave lens component constituting the second lens group, reference symbols $n_{10}$, $n_{11}$, $n_{12}$ and $n_{13}$ respectively represent refractive indices of respective lens components constituting the fourth lens group, reference symbols $\nu_5$ represents Abbe's number of the lens element arranged on the image side in the cemented doublet constituting the second lens group, reference symbol $\nu_7$ represents Abbe's number of the biconvex lens component constituting the second lens group, and reference symbol $\nu_{13}$ represents Abbe's number of the biconvex lens component arranged on the image side in the fourth lens group.

3. A zoom lens system according to claim 2, in which said zoom lens system has the following numerical data:

| f = 67~194, F 4 | | |
|---|---|---|
| $r_1 = 104.584$ | | |
| $d_1 = 2.7$ | $n_1 = 1.78472$ | $\nu_1 = 25.68$ |
| $r_2 = 56.047$ | | |
| $d_2 = 7.2$ | $n_2 = 1.58913$ | $\nu_2 = 60.97$ |
| $r_3 = -3513.726$ | | |
| $d_3 = 0.15$ | | |
| $r_4 = 84.41$ | | |
| $d_4 = 5$ | $n_3 = 1.51633$ | $\nu_3 = 64.15$ |
| $r_5 = -2910.332$ | | |
| $d_5 = l_1$ | | |
| $r_6 = -186.863$ | | |
| $d_6 = 1.5$ | $n_4 = 1.713$ | $\nu_4 = 53.84$ |
| $r_7 = 23.862$ | | |
| $d_7 = 3.7$ | $n_5 = 1.80518$ | $\nu_5 = 25.43$ |
| $r_8 = 34.675$ | | |
| $d_8 = 4$ | | |
| $r_9 = -59.071$ | | |
| $d_9 = 1.45$ | $n_6 = 1.7725$ | $\nu_6 = 49.66$ |
| $r_{10} = 123.217$ | | |
| $d_{10} = 0.64$ | | |

-continued

| | | |
|---|---|---|
| $r_{11} = 71.931$ | | |
| $d_{11} = 2.95$ | $n_7 = 1.80518$ | $\nu_7 = 25.43$ |
| $r_{12} = -7730.28$ | | |
| $d_{12} = l_2$ | | |
| $r_{13} = 116.711$ | | |
| $d_{13} = 5.84$ | $n_8 = 1.51633$ | $\nu_8 = 64.15$ |
| $r_{14} = -31.816$ | | |
| $d_{14} = 2.2$ | $n_9 = 1.78472$ | $\nu_9 = 25.68$ |
| $r_{15} = -54.816$ | | |
| $d_{15} = l_3$ | | |
| $r_{16} = 34.489$ | | |
| $d_{16} = 4.62$ | $n_{10} = 1.62012$ | $\nu_{10} = 49.66$ |
| $r_{17} = -2770.959$ | | |
| $d_{17} = 1.88$ | | |
| $r_{18} = -229.365$ | | |
| $d_{18} = 1.92$ | $n_{11} = 1.76182$ | $\nu_{11} = 26.52$ |
| $r_{19} = 191.998$ | | |
| $d_{19} = 45.653$ | | |
| $r_{20} = -18.906$ | | |
| $d_{20} = 1.92$ | $n_{12} = 1.7725$ | $\nu_{12} = 49.66$ |
| $r_{21} = -41.177$ | | |
| $d_{21} = 0.15$ | | |
| $r_{22} = 155.437$ | | |
| $d_{22} = 4.6$ | $n_{13} = 1.53172$ | $\nu_{13} = 48.9$ |
| $r_{23} = -48.663$ | | |

| f | $l_1$ | $l_2$ | $l_3$ |
|---|---|---|---|
| 67 | 1.282 | 36.535 | 11.431 |
| 114 | 23.524 | 23.47 | 2.256 |
| 194 | 36.589 | 1.228 | 11.431 |

$f_B = 41.143$
$f_I = 96.453$
$f_{II} = -31.67$
$f_{III} = 97.353$
$f_{IV} = 115.031$
$f_a = 88.526$ wherein reference symbols $r_1$ through $r_{23}$ respectively represent radii of curvature of respective lens surfaces, reference symbols $d_1$ through $d_{22}$ respectively represent thicknesses of respective lenses and airspaces between respective lenses, reference symbols $n_1$ through $n_{13}$ respectively represent refractive indices of respective lenses, reference symbols $\nu_1$ through $\nu_{13}$ respectively represent Abbe's numbers of respective lenses, reference symbol f represents the focal length of the lens system as a whole, and reference symbol $f_B$ represents the back focal length.

4. A zoom lens system according to claim 2, in which said zoom lens system has the following numerical data:

| | $f = 67 \sim 194$ | F 4 | |
|---|---|---|---|
| $r_1 = 129.447$ | | | |
| $d_1 = 2.6$ | $n_1 = 1.78472$ | $\nu_1 = 25.68$ | |
| $r_2 = 58.346$ | | | |
| $d_2 = 6.8$ | $n_2 = 1.6228$ | $\nu_2 = 57.06$ | |
| $r_3 = \infty$ | | | |
| $d_3 = 0.15$ | | | |
| $r_4 = 84.325$ | | | |
| $d_4 = 4.6$ | $n_3 = 1.61272$ | $\nu_3$ 58.75 | |
| $r_5 = \infty$ | | | |
| $d_5 = l_1$ | | | |
| $r_6 = -208.086$ | | | |
| $d_6 = 1.5$ | $n_4 = 1.7432$ | $\nu_4 = 49.31$ | |
| $r_7 = 23.861$ | | | |
| $d_7 = 3.7$ | $n_5 = 1.78472$ | $\nu_5 = 25.68$ | |
| $r_8 = 35.678$ | | | |
| $d_8 = 4$ | | | |
| $r_9 = -54.032$ | | | |
| $d_9 = 1.45$ | $n_6 = 1.7725$ | $\nu_6 = 49.66$ | |
| $r_{10} = 98.148$ | | | |
| $d_{10} = 0.64$ | | | |
| $r_{11} = 68.72$ | | | |
| $d_{11} = 2.95$ | $n_7 = 1.78472$ | $\nu_7 = 25.68$ | |
| $r_{12} = -254.398$ | | | |
| $d_{12} = l_2$ | | | |
| $r_{13} = 125.076$ | | | |
| $d_{13} = 5.84$ | $n_8 = 1.51112$ | $\nu_8 = 60.48$ | |
| $r_{14} = -30.267$ | | | |
| $d_{14} = 2.2$ | $n_9 = 1.78472$ | $\nu_9 = 25.68$ | |
| $r_{15} = -51.696$ | | | |
| $d_{15} = l_3$ | | | |
| $r_{16} = 33.434$ | | | |
| $d_{16} = 5.28$ | $n_{10} = 1.54072$ | $\nu_{10} = 47.2$ | |
| $r_{17} = -227.929$ | | | |
| $d_{17} = 1.7$ | | | |
| $r_{18} = -137.992$ | | | |
| $d_{18} = 2.16$ | $n_{11} = 1.84666$ | $\nu_{11} = 23.88$ | |
| $r_{19} = 612.979$ | | | |
| $d_{19} = 46.24$ | | | |
| $r_{20} = -19.236$ | | | |
| $d_{20} = 1.95$ | $n_{12} = 1.7725$ | $\nu_{12} = 49.66$ | |
| $r_{21} = -39.456$ | | | |
| $d_{21} = 0.15$ | | | |
| $r_{22} = 117.934$ | | | |
| $d_{22} = 4.2$ | $n_{13} = 1.53172$ | $\nu_{13} = 48.9$ | |
| $r_{23} = -67.342$ | | | |

| f | $l_1$ | $l_2$ | $l_3$ |
|---|---|---|---|
| 67 | 1.961 | 36.24 | 11.039 |
| 114 | 24.203 | 23.175 | 1.863 |
| 194 | 37.268 | 0.933 | 11.039 |

$f_B = 40.84$
$f_I = 95.593$
$f_{II} = -31.67$
$f_{III} = 97.853$
$f_{IV} = 116.658$
$f_a = 69.226$ wherein reference symbols $r_1$ through $r_{23}$ respectively represent radii of curvature of respective lens surfaces, reference symbols $d_1$ through $d_{22}$ respectively represent thicknesses of respective lenses and airspaces between respective lenses, reference symbols $n_1$ through $n_{13}$ respectively represent refractive indices of respective lenses, reference symbols $\nu_1$ through $\nu_{13}$ respectively represent Abbe's numbers of respective lenses, reference symbol f represents the focal length of the lens system as a whole, and reference symbol $f_B$ represents the back focal length.

5. A zoom lens system according to claim 2, in which said zoom lens system has the following numerical data:

| | $f = 67 \sim 194$ | F 4 | |
|---|---|---|---|
| $r_1 = 126.289$ | | | |
| $d_1 = 2.2$ | $n_1 = 1.78472$ | $\nu_1 = 25.68$ | |
| $r_2 = 57.106$ | | | |
| $d_2 = 6.3$ | $n_2 = 1.6228$ | $\nu_2 = 57.06$ | |
| $r_3 = 1616.56$ | | | |
| $d_3 = 0.15$ | | | |
| $r_4 = 85.153$ | | | |
| $d_4 = 4.4$ | $n_3 = 1.6228$ | $\nu_3 = 57.06$ | |
| $r_5 = -2726.243$ | | | |
| $d_5 = l_1$ | | | |
| $r_6 = -201.941$ | | | |
| $d_6 = 1.48$ | $n_4 = 1.734$ | $\nu_4 = 51.49$ | |
| $r_7 = 23.917$ | | | |
| $d_7 = 3.2$ | $n_5 = 1.78472$ | $\nu_5 = 25.68$ | |
| $r_8 = 36.601$ | | | |
| $d_8 = 4.5$ | | | |
| $r_9 = -57.526$ | | | |
| $d_9 = 1.48$ | $n_6 = 1.72$ | $\nu_6 = 50.25$ | |
| $r_{10} = 93.55$ | | | |
| $d_{10} = 0.65$ | | | |
| $r_{11} = 67.273$ | | | |
| $d_{11} = 3$ | $n_7 = 1.78472$ | $\nu_7 = 25.68$ | |
| $r_{12} = -886.652$ | | | |
| $d_{12} = l_2$ | | | |
| $r_{13} = 128.789$ | | | |
| $d_{13} = 5.95$ | $n_8 = 1.51823$ | $\nu_8 = 58.96$ | |

-continued

| | | | |
|---|---|---|---|
| $r_{14} = -31.218$ | | | |
| $d_{14} = 1.59$ | | $n_9 = 1.78472$ | $\nu_9 = 25.68$ |
| $r_{15} = -53.43$ | | | |
| $d_{15} = l_3$ | | | |
| $r_{16} = 35.564$ | | | |
| $d_{16} = 4.4$ | | $n_{10} = 1.62012$ | $\nu_{10} = 49.66$ |
| $r_{17} = -1685.808$ | | | |
| $d_{17} = 1.9$ | | | |
| $r_{18} = -315.291$ | | | |
| $d_{18} = 1.96$ | | $n_{11} = 1.78472$ | $\nu_{11} = 25.68$ |
| $r_{19} = 156.572$ | | | |
| $d_{19} = 46.57$ | | | |
| $r_{20} = -20.109$ | | | |
| $d_{20} = 1.96$ | | $n_{12} = 1.7725$ | $\nu_{12} = 49.66$ |
| $r_{21} = -35.524$ | | | |
| $d_{21} = 0.29$ | | | |
| $r_{22} = 125.208$ | | | |
| $d_{22} = 4$ | | $n_{13} = 1.53172$ | $\nu_{13} = 48.9$ |
| $r_{23} = -86.763$ | | | |

| f | $l_1$ | $l_2$ | $l_3$ |
|---|---|---|---|
| 67 | 1.225 | 36.487 | 12.025 |

-continued

| 114 | 23.88 | 23.179 | 2.679 |
|---|---|---|---|
| 194 | 37.188 | 0.524 | 12.025 |

$f_B = 44.12$
$f_I = 96.172$
$f_{II} = -32.259$
$f_{III} = 98.672$
$f_{IV} = 116.929$
$f_a = 79.794$ wherein reference symbols $r_1$ through $r_{23}$ respectively represent radii of curvature of respective lens surfaces, reference symbols $d_1$ through $d_{22}$ respectively represent thicknesses of respective lenses and airspaces between respective lenses, reference symbols $n_1$ through $n_{13}$ respectively represent refractive indices of respective lenses, reference symbols $\nu_1$ through $\nu_{13}$ respectively represent Abbe's numbers of respective lenses, reference symbol f represents the focal length of the lens system as a whole, and reference symbol $f_B$ represents the back focal length.

* * * * *